United States Patent [19]

Herbaugh et al.

[11] 4,354,725

[45] Oct. 19, 1982

[54] INSULATED TERMINAL ASSEMBLY

[75] Inventors: Donald W. Herbaugh; Paul J. Kline; Herbert C. Stull, all of Erie, Pa.

[73] Assignee: General Electric Co., Schenectady, N.Y.

[21] Appl. No.: 246,765

[22] Filed: Mar. 23, 1981

Related U.S. Application Data

[63] Continuation-in-part of Ser. No. 142,555, Apr. 21, 1980, abandoned.

[51] Int. Cl.$^3$ .............................................. H01R 9/10
[52] U.S. Cl. ............................ 339/214 R; 339/263 R
[58] Field of Search ................... 339/214, 218, 263 R, 339/263 B

[56] References Cited

U.S. PATENT DOCUMENTS

| | | | |
|---|---|---|---|
| 1,024,248 | 4/1912 | Capper et al. | 339/214 R |
| 1,634,176 | 6/1927 | Cunliffe | 339/263 B |
| 2,726,280 | 12/1955 | Demurjian | 339/218 R |

FOREIGN PATENT DOCUMENTS

| | | | |
|---|---|---|---|
| 48014 | 3/1940 | Netherlands | 339/214 R |

*Primary Examiner*—Joseph H. McGlynn
*Attorney, Agent, or Firm*—Vale P. Myles

[57] ABSTRACT

An insulated electric terminal assembly having an electrically conductive stud with a knurled outer surface held in locking engagement with a molded dielectric bolt mounted around the exterior surface of the stud, in combination with a molded dielectric nut adapted to be threaded onto the dielectric bolt. The nut is provided with a generally cylindrical surface portion over a predetermined part of its axial length which has a diameter at least as great as the maximum diameter of the remainder of the axial length of the nut, which includes generally parallel flat surfaces for receiving a torquing tool for rotating the nut. A unique configuration of the dielectric bolt head enables it to be securely fastened in snug relationship to a curved supporting surface having an aperture through it for receiving the shank portion of the dielectric bolt.

15 Claims, 6 Drawing Figures

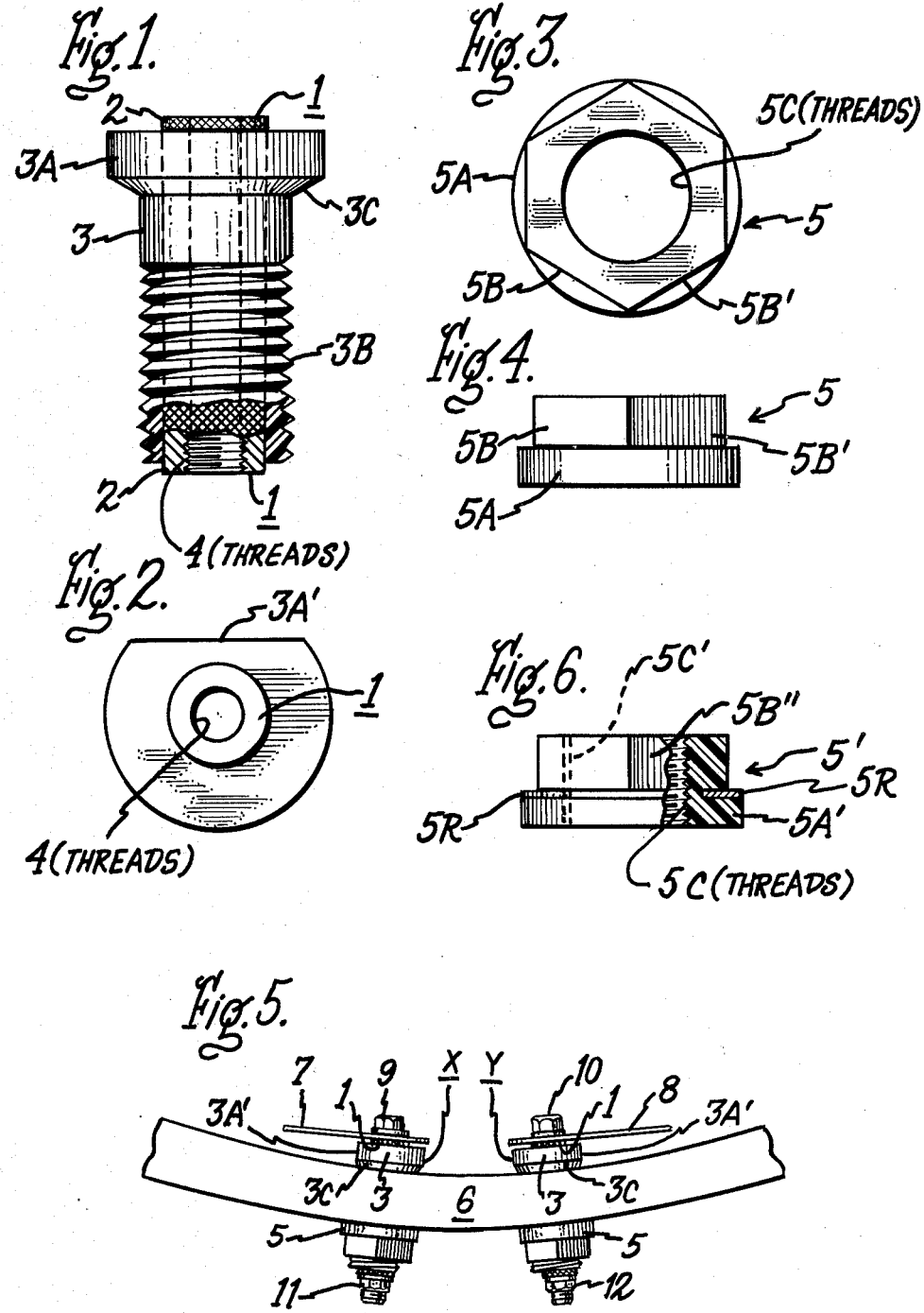

INSULATED TERMINAL ASSEMBLY

This is a continuation-in-part of application Ser. No. 142,555, filed Apr. 21, 1980, now abandoned.

BACKGROUND OF THE INVENTION

This invention relates to insulated electrical terminal assemblies and more particularly relates to such assemblies suitable for use in making electric connections on a battery-powered truck or similar apparatus that subjects the electric terminals thereon to extensive vibration, thermal cycling, and exposure to contaminants.

It is generally well known to provide various types of electrical terminal assemblies for connecting internal circuit components to other electrical devices located externally of an apparatus. For example, in the manufacture of battery-powered vehicles of the kind for which the present invention is particularly well suited, it is known to mount electric motor connection terminal assemblies on an appropriate part of a motor housing or other suitable support structure in order to provide convenient means for making electrical connections between the drive motor windings and a plurality of interconnected batteries or other power source for the motor. Typically, such a terminal includes a knurled brass stud that is within a dielectric sleeve to insulate the stud from the motor housing. The stud and sleeve assembly is then characteristically glued into an aperture in the motor frame so that the motor windings can be connected to one end of the stud, while a battery terminal lead is connected to the other end of the stud, which extends beyond the outer surface of the frame or housing.

Although such conventional electric terminal assemblies have provided satisfactory service for years, it has been found that they also present a number of disadvantages. Such disadvantages can be manifested during both the initial manufacture and installation of such terminal assemblies, and in the use and operation of the terminals in the field. Perhaps the most common disadvantage of such prior art terminal assemblies is that the glued connections in them can be broken in manufacturing operations when assembly connections are made by tightening bolts into the inner end of the studs to fasten motor windings to the terminal. Because such assembly operations are usually done manually, the torque forces applied vary from installer to installer and even the same installer will often apply different torque forces on separate assemblies. Even if such breakage does not occur in the manufacture of the previously known, glue-fastened type of terminal assemblies, their use is undesirably expensive due to the relatively long cure cycles needed to properly set the adhesive bonds on the inner and outer surfaces of the dielectric sleeves. In addition to such manfacturing problems with those earlier terminal assemblies, the glued components can be relatively easily broken apart in the field responsive to a bolt or nut being tightened down on a terminal to connect a battery lead or other power source to the outer end of the terminal. Again, such connections are manually made, so torque forces may vary in a wide, and uncontrolled, range from one installer to another.

Because of the normal need to mount such terminals through apertures in a curved motor housing or similar curved supporting surface, it has often been difficult to make a suitably strong mechanical connection between the dielectric sleeve of the terminal assembly and the housing, except by use of the glued-type of connnections mentioned above. Moreover, the search for a satisfactory solution to such known disadvantages was complicated by the need to employ dielectric materials for the sleeves that have coefficients of expansion close to those of the stud portion of the terminal assembly, while at the same time affording adequate resistance to thermal and electrical shock and to deterioration from contaminants, in order to make such terminals adaptable for operation on battery trucks and similar rugged-duty apparatus.

Another problem often encountered in the application of prior art plastic terminal assemblies is that when devices, such as motor housings, on which the terminals are mounted, happen to be dropped, jolted or otherwise mishandled, the terminal assembly is frequently cracked or otherwise damaged. The present invention affords a terminal assembly structure that is much more resistant to damage as a consequence of mishandling. Specifically, in one form of the invention a reinforcing ring is molded into the fastening nut of a terminal assembly to enable the nut to endure about fifty percent higher torquing forces than it could endure without such a ring. In addition, the molded-in ring prevents nuts from undesirably opening up when the plastic of the nuts becomes cracked.

SUMMARY OF THE INVENTION

In the preferred embodiment of the invention disclosed herein an electric terminal assembly is provided with an electrically conductive stud having a knurled outer surface on which there is mounted a molded dielectric bolt that is held in fixed relationship to the stud by locking engagement between the molded uneven inner surface of the bolt and the knurled portions of the stud. The head portion of the molded bolt is formed to cooperate with a curved surface of an electrically conductive supporting member in a unique manner, and a dielectric nut is formed to be threadably mounted on the bolt to secure the terminal assembly with its central portion disposed through an aperture in a conductive supporting member so that the opposite ends of the conductive stud extend inwardly and outwardly respectively from the plane of the supporting member. The dielectric nut of the terminal assembly is formed to accommodate the high torque force typically used in securing the bolt and nut in operating position on such a conductive supporting member.

In one form of the invention, a terminal-securing nut configured to include the basic structural advantages of the invention is further improved relative to prior art terminal assemblies, by having a reinforcing ring molded into the nut.

OBJECTS OF THE INVENTION

A primary object of the invention is to provide an electric terminal assembly that obviates the above-mentioned disadvantages of related prior art terminal assemblies.

Another object of the invention is to provide an electric terminal assembly comprising a simply manufactured two-piece terminal and fastening means that is operable to mechanically support the terminal assembly in operating position through an aperture in a conductive support member.

Yet another object of the invention is to provide a rugged, readily manufacturable insulated terminal assembly that can be easily and reliably mounted through an aperture in a curved, electrically conductive surface in a manner that provides means for readily connecting electric conductors to both the interior and exterior conductive surfaces of the terminal assembly.

A further object of the invention is to provide an insulated electric terminal assembly having a unique bolt head and an associated threaded nut member that enable the assembly to endure high torque forces when they are applied to securely clamp the bolt and nut in operating position against surfaces of a curved supporting conductive member on which the terminal is mounted.

Additional objects and advantages of the invention will be apparent to those skilled in the art from the description of it that follows, presented in connection with the associated drawings.

BRIEF DESCRIPTION OF THE DRAWINGS

FIG. 1 is a side elevation view, partly in cross-section, of a bolt and stud portion of an electric terminal assembly constructed according to the invention The bolt is shorter than the stud and exposes a knurled outer surface of the stud.

FIG. 2 is a top plan view of the bolt and stud members shown in FIG. 1.

FIG. 3 is a plan view of the outer end of a dielectric nut that is adapted to be threaded onto the bolt shown in FIGS. 1 and 2, to complete an electric terminal assembly according to the invention.

FIG. 4 is a side elevation view, partly in phantom, of the threaded nut shown in FIG. 3.

FIG. 5 is a perspective view of a curved electrically conductive supporting member, constituting a portion of an electric motor housing, having two adjacent apertures through which two electric terminal assemblies similar to those illustrated in the foregoing Figures of the drawing, are mounted in operating positions, with a pair of electrical conductors shown connected respectively to the inner ends of the two terminals by threaded bolts that have been rotated into threaded portions of the respective stud terminals. Also, bolts are shown inserted into the outer threaded ends of the studs to afford means for connecting other conductors to the terminal assemblies.

FIG. 6 is a side elevation, partly in phantom and partly in cross-section of a threaded nut somewhat like that shown in FIGS. 3 and 4, but including a reinforcing ring molded into the nut at the junction of its cylindrical portion and its hexagonal portion.

BRIEF DESCRIPTION OF THE PREFERRED EMBODIMENTS

The preferred embodiments of the invention discussed herein have been found to be particularly suitable for use on battery powered electric trucks that encounter extensive vibration and thermal cycling during their normal use. In addition, the disclosed embodiments of the invention have been found to possess excellent characteristics insofar as they are highly resistant to damage by corrosive and contaminating environments or by high torque forces applied to the terminal assembly during normal connection of electrical conductors to it. It should be understood, however, that these and other embodiments of the invention are suitable for use in a wide variety of different applications. Moreover, although the preferred embodiments of the invention described herein are particularly adaptable for use with a curved electrically conductive supporting member, such as the curved housing or frame of an electric motor, the invention can readily be used in combination with other configurations of mounting surfaces.

In order to describe a preferred embodiment of the invention, reference is now made to FIGS. 1-4 of the drawing in which there is illustrated a molded bolt and conductive stud member (FIGS. 1 and 2) and a molded nut member (FIGS. 3 and 4). A terminal assembly constructed according to the present invention comprises both the stud and bolt member shown in FIG. 1 and the nut member shown in FIG. 3, or an alternative nut member such as that shown in FIG. 6 (which will be more fully described later). More specifically, in the preferred embodiment of the invention disclosed herein, the terminal assembly comprises an electrically conductive metal stud 1 that has a predetermined portion of its outer surface knurled, as can be partly seen by the knurling 2 in the broken-away area of the bolt 3 on the right side of FIG. 1. In this embodiment of the invention, the stud 1 is formed of brass, but copper, aluminum or other suitable conductive metals may be used in alternative embodiments of the invention. Likewise, the knurled surface 2 in this embodiment of the invention extends over substantially the entire outer cylindrical surface of the stud 1, and the knurling is formed by rolling ridges in two directions on that outer surface to form a cross-hatched pattern. Of course, in other embodiments of the inventin the knurled portion of the stud 1 could be made in a different pattern over a substantially different area, so long as good locking engagement is provided bewteen the outer surface of the stud 1 and the inner surface of the bolt 3 in order to prevent relative movement between those members when high torque forces are applied to the stud 1 during the operations used to connect electric terminals to either end of the stud. A threaded dielectric bolt 3 is mounted on the knurled surface of the stud 1 so that an inner irregular or uneven surface of the bolt 3 is arranged in locking engagement with the knurled portion 2 of the stud 1, thereby to secure the bolt in locked relationship relative to the stud.

In this form of the invention, the bolt 3 is formed of a suitable thermosetting resin molding composition that has a coefficient of thermal expansion sufficiently close to the coefficient of thermal expansion for the stud 1 so that the locking engagement between those members is not lost when the terminal assembly is subject to thermal cycling in a range from 31 50° to 150° C. We have found that a particularly useful molding composition for this purpose is a polybutylene terephthalate polyester molding compound containing a glass filler in the range of 10 to 50% by weight, and preferably about 30% by weight glass filler. Such a compound is available from General Electric Company, 1 River Rd., Schenectady, N.Y. under the Tradename, Valox 420. That composition has been found to be thermally and mechanically stable in the above noted range of temperatures, and also possesses mechanical ruggedness and good resistance to environmental contaminants, so that it affords the desired objectives noted at the outset above.

At this point it should also be noted that the same molding compound has been found desirable for use in manufacturing threaded nut members, such as the nut 5 shown in FIG. 3 of the drawing. Other molding compounds may be used in practicing the invention provided that they possess the necessary physical and mechanical properties and adequate resistance to temperature changes and corrosion to suit them for applications such as the battery truck terminal applications described above.

In fact, we have found that for certain applications in which terminals are exposed to severe mechanical jolts or other mishandling, it is possible in some instances to improve their anticipated life by using for the bolt and nut molding composition another high impact and temperature resistant engineering polyetherimide resin that is commercially available from General Electric Co. under the Trademark, Ultem ®. A description of that resin and a method for making it are disclosed in U.S. Pat. No. 3,838,097, which issued on Sept. 24, 1974, and another method for making that resin is disclosed in U.S. Pat. No. 3,803,085, which issued Apr. 9, 1974. Both of those patents are assigned to the assignee of the present invention.

As seen in FIG. 2, the bolt 3 has on its top end a head 3A, which has a diameter significantly greater than the diameter of the partly threaded shaft 3B of the bolt. The bolt 3 is made significantly shorter than the conductive stud 1, in this form of the invention, so that both ends of the stud 1 extend beyond the respective juxtaposed ends of the bolt 3. This arrangement assures that when an electrical conductor is secured to either end of the stud 3, it will make good electrical contact with the projecting end of the stud, rather than being supported mechanically by the adjacent end of the dielectric bolt.

A novel feature of the bolt 3 disclosed in this embodiment of the invention, is that the bolt head 3A is generally cylindrical in configuration except for having one essentially flat side 3A' (shown in FIG. 2). The flat side 3A' on the bolt head affords two desired functions. First, it provides a holding surface for securing the bolt head against rotation, with a wrench or other suitable tool, while a conductor is being fastened to the conductive stud 1 by threading another bolt into the threaded central bore of the stud. Secondly, the flat side 3A' of the bolt head enables the head to be fastened more snugly against a conductive member that has a curved surface positioned against the bolt head than would be the case if the head were completely circular. That latter objective is further enhanced in the construction of the preferred embodiment of the invention by incorporation of an axially inwardly tapered surface 3C on the inner end of the bolt head, as seen in FIG. 1. The tapered surface 3C on the side of the bolt head 3A opposite to the flat side 3A' is effective to further enable the head to be fastened snugly against a conductive member having a curved surface, because it will be seen that the tapered surface 3C may be made to generally parallel the curvature of such a curved supporting surface, as will be discussed in more detail below with reference to FIG. 5.

In order to enable electric conductors to be readily fastened in engagement with the opposite ends of the conductive stud 1, the inner surfaces of both ends of the stud 1 are threaded to receive bolts therein. Accordingly, bolts can be screwed into either or both of the ends of the stud 1 to clamp electrical conductors between such bolts and respective ends of stud 1. Further description of such a connecting operation will be given below with reference to FIG. 5.

Referring now to FIGS. 3 and 4 of the drawing, a preferred embodiment of a threaded dielectric nut suitable for being threaded onto the threaded portion 3B of bolt 3 will now be described. It should be understood at this point that the terminal assembly of the invention, comprising the threaded nut 5 and the stud 1, having the threaded bolt 3 molded thereon to define an integral assembly, are operable, responsive to the bolt being inserted through an aperture in an electrically conductive member, to clamp the stud in a fixed and electrically isolated relationship to such a conductive member, according to a primary objective of the invention. Thus, no relatively easily breakable connecting means is relied on to secure the terminal assembly in such a desired operating position.

According to the invention, the nut 5 shown in FIGS. 3 and 4, has a generally cylindrical side surface 5A that extends for a predetermined portion of the axial length of the nut, while the remainder of the axial length of the nut comprises a plurality of substantially flat adjacent surfaces 5B, 5B', etc. that are arranged in an even number of adjoining surfaces, comprising substantially parallel pairs of surfaces that are adapted to cooperate with a wrench or other conventional torquing tool, used in rotating the nut 5 onto the threaded portion 3B of bolt 3. In the preferred embodiment of the invention the generally cylindrical portion 5A of the nut 5 has a maximum diameter substantially equal to the maximum diameter of the remainder portion of the nut which includes the plurality of flat side surfaces. In order to afford the necessary torquing strength for the nut 5, the generally cylindrical portion of the nut should always have a diameter at least as great as the maximum diameter of the remainder portion of the nut.

In an alternative form of the invention a nut 5', such as the one shown in FIG. 6, is molded with a reinforcing ring 5R molded into the ring a the junction of its cylindrical portion 5A' and the hexagonal portion 5B''. The ring is formed of steel or other suitably strong and corrosion resistant material, and it has an outer diameter essentially the same as that of the cylindrical portion 5A'. The inner diameter of the ring 5R is such that it does not overlap or interfere with the threads 5C' (illustrated with phantom lines in FIG. 6) through the nut. This novel nut structure is particularly useful for applications where torque forces up to fifty percent greater than those that can be safely applied to a nut such as that shown in FIGS. 3 and 4 are likely to be applied in assemblying or subsequently adjusting a terminal assembly constructed according to the invention. Also, use of a nut 5 with a ring 5R is desirable in terminal applications where rugged use or mishandling is likely to crack the resin of the nut. Should such cracks develop, the ring 5R will prevent them from opening unduly and allowing the nut to drop off an associated terminal bolt.

Those skilled in the art will recognize that the unique configurations of the bolt 3 and nut 5 disclosed herein may be formed by various manufacturing processes, such as by machining; however, in the preferred embodiment of the invention, both the bolt 3 and the nut 5 are molded in suitable dies using the above-described molding compound of Valox 420 or a suitable alternative compound such as Ultem resin. Thus, the bolt 3 is molded around the knurled stud 1 so that the inner surface of the bolt is in locking engagement with the knurled portion 2 of stud 1. The molding operation is also effective to form the threads 3B on bolt 1 and threads 5C on the nut 5. In this form of the invention the generally cylindrical side surface portions 3A of bolt 3 and 5A of nut 5, are substantially equal in diameter, but it will be recognized that in given applications of the invention slightly different sized diameters for these respective members may be advantageously employed.

For example, if an electrically conductive surface having a sharper curvature than that shown in the drawing is used to mount an alternative form of the terminal assembly of the invention, the generally cylindrical surface 3A on the bolt 3 may be made smaller in diameter to better fit snugly against such a surface. In order to better understand such application principles of the invention, reference may now be made to FIG. 5.

In FIG. 5, two insulated electric terminal assemblies X and Y, constructed according to the invention, are shown mounted through a pair of apertures in a curved electrically conductive surface 6, which may be a portion of an electric motor housing. A pair of electric conductors 7 and 8, which may be leads from an electric motor winding mounted within the housing surface 6 are clamped respectively to the terminal assemblies X and Y by a pair of standard threaded bolts 9 and 10 which are threaded into the inner ends of the threaded apertures (designated in FIG. 2 by the numeral 4) of the respective assemblies. For purposes of illustration, a second pair of standard bolts 11 and 12 are shown threaded into the outer ends of the terminal assemblies X and Y, so that they can be used to clamp electric conductors from exterior circuits, such as leads from a battery power supply, to the terminal assemblies X and Y.

In order to mount the terminal assemblies X and Y in operating position on the curved electrically conductive supporting surface member 6, according to the invention, the threaded bolt portions 3 of each terminal assembly member are inserted through apertures formed in the member 6, then the threaded dielectric nuts 5 are screwed onto the outer end of the respective bolts 3 and torqued to a predetermined force by clamping a wrench on the flat sides 3A' (see FIG. 2) of the bolt heads. It will be noted that the flat sides 3A' of both bolts are generally in alignment with the longitudinal axis of curvature of the surface 6, thus enabling the bolt heads to be positioned snugly against that curved surface. Also, it should be noted that the tapered surface 3C on the inner ends of the bolt heads further enable the bolt heads to be nested more snugly against the curved surface.

Of course, a conventional wrench or other suitable tool may be used to engage and hold the nuts 5 while they are being torqued down on the surface 6 by being threaded onto the bolts 3. After the terminal assemblies X and Y are thus securely mounted in their operating positions, the bolts 9 and 10 are threaded into the inner ends of the conductive studs 1 (also see FIGS. 1 and 3) so that the heads of these bolts clamp between them and the inner ends of the studs 1 the suitably apertured ends of the conductors 7 and 8. A similar procedure is used in connecting other terminals to the outermost ends of the studs 1, with the bolts 11 and 12, when it is desired to connect those terminals to an electric power source.

From the description of the invention presented herein and the embodiments of it illustrated, various modifications and alternative forms of the invention will be apparent to those skilled in the art; thus, it is our intention to encompass within the scope of the following claims the true limits of the invention.

What is claimed is:

1. An insulated electric terminal assembly comprising an electrically conductive metal stud having a predetermined portion of its outer surface knurled, a threaded dielectric bolt mounted in fixed relationship with said stud with an irregular inner surface of the bolt positioned in locking engagement with said knurled surface, said bolt having on one end a head with a diameter greater than the diameter of the threaded part of the bolt, and a threaded dielectric nut formed with threads that are adapted to be threaded onto the threaded part of said bolt, said threaded bolt and nut being operable responsive to the bolt being inserted through an aperture in an electrically conductive member to mechanically secure said stud in fixed and dielectrically isolated relationship to said conductive member.

2. A terminal assembly as defined in claim 1 wherein said dielectric bolt is significantly shorter than said stud and both ends of said stud extend beyond the respective juxtaposed ends of the bolt.

3. A terminal assembly as defined in claim 1, wherein said bolt is molded around the knurled stud, and wherein said predetermined knurled portion comprises substantially the entire axially outermost surface of said stud.

4. A terminal assembly as defined in claim 3 wherein said nut is molded of a dielectric material having substantially the same thermal coefficient of expansion as that of the material forming said bolt.

5. A terminal assembly as defined in claim 4 wherein said nut includes a reinforcing ring molded into it, said reinforcing ring having a central opening with a diameter greater than the thread diameter of said nut.

6. A terminal assembly as defined in claim 3 wherein the head of said bolt is formed to have at least one essentially flat side, thereby to enable the head to be fastened snugly against a conductive member having a curved surface adapted to contact the bolt head.

7. A terminal assembly as defined in claim 6 wherein said molded bolt head is generally cylindrical in configuration except for said flat side and an axially inwardly tapered surface on the inner end of said head, said tapered surface on the inner side of said head opposite the flat side of the head being effective to further enable the head to be fastened snugly against a conductive member having a curved surface.

8. A terminal assembly as defined in claim 4 wherein the nut has a generally cylindrical side surface for a predetermined portion of its axial length and the remainder of its axial length comprises a plurality of substantially flat, adjoining surfaces.

9. A terminal assembly as defined in claim 8 wherein said plurality of substantially flat, side surfaces comprises an even number of surfaces arranged in substantially parallel pairs, and wherein the diameter of said generally cylindrical side surfaces on the nut is at least as large as the maximum diameter of said remainder portion of the nut.

10. A terminal assembly as defined in claim 8 including a reinforcing metal ring molded into the nut at the junction of said generally cylindrical side surface and of said plurality of flat adjoining surfaces, said reinforcing ring having an outer diameter substantially equal to that of the generally cylindrical surface of said nut, and said ring further having a central opening concentric with the threaded aperture through the nut and larger than the diameter of said threaded aperture.

11. A terminal assembly as defined in claim 1, wherein said stud is threaded on the inner surface of both ends thereof to receive bolts in said threaded ends, whereby the ends of said stud are adapted to have clamped against them electrical conductors disposed between the respective ends of the stud and bolts threaded respectively into said ends.

12. A terminal as defined in claim 11 wherein said dielectric bolt head and threaded nut each have generally cylindrical side surface portions that are substantially equal in diameter.

13. A terminal as defined in claim 1, wherein said dielectric bolt and nut are each formed of a thermosetting resin material that is structurally stable in a range of temperatures from −50° to 150° Centigrade.

14. A terminal assembly as defined in claim 13 wherein said thermosetting resin material is a polybutylene terephtalate polyester molding compound containing between 10 and 50 percent, by weight, glass.

15. A terminal assembly as defined in claim 13 wherein said resin material is a high temperature and impact resistance engineering polyetherimide resin.

* * * * *